No. 795,553. PATENTED JULY 25, 1905.
H. B. SHERMAN.
ROOFING NAIL.
APPLICATION FILED FEB. 17, 1905.

WITNESSES:
C. H. Walker
James R. Mansfield

INVENTOR
Howard B. Sherman
By
Alexander Towill
Attorneys.

UNITED STATES PATENT OFFICE.

HOWARD B. SHERMAN, OF BATTLECREEK, MICHIGAN.

ROOFING-NAIL.

No. 795,553.  Specification of Letters Patent.  Patented July 25, 1905.

Application filed February 17, 1905. Serial No. 246,063.

*To all whom it may concern:*

Be it known that I, HOWARD B. SHERMAN, of Battlecreek, in the county of Calhoun and State of Michigan, have invented certain new and useful Improvements in Roofing-Nails; and I hereby declare that the following is a full, clear, and exact description thereof, reference being had to the accompanying drawings, which form part of this specification.

This invention is an improvement in roofing-nails, especially designed for use in securing felt, tar-paper, and other like flexible coverings to roofs, walls, &c.; and its object is to provide a nail which will securely hold the covering and will also prevent water seeping or passing back under the head to the stem of the nail.

I am aware that roofing-nails have heretofore been formed of metal disks or plates transfixed by ordinary nails and that "felt roofing" is ordinarily fastened by means of ordinary nails driven through small tin disks or washers.

My present invention consists principally in providing the head of the roofing-nail with a downwardly-projecting corrugation or rib which may be of any desired contour, provided it encircles or incloses the stem of the nail and is a distance within the outer periphery of the plate, so that when the nail is driven home this rib embeds itself into the felt or other material and forms a water-tight joint between the head and felting, whereby access of water to the stem is prevented and danger of leaks so annoying in the ordinary felt roofing-nails is entirely obviated. Said rib, moreover, stiffens the head and prevents its warping and insures a secure bite or grip of the nail upon the felting.

The invention consists in the improved roofing-nail hereinafter claimed, and described with reference to the accompanying drawings, in which—

Figure 1:
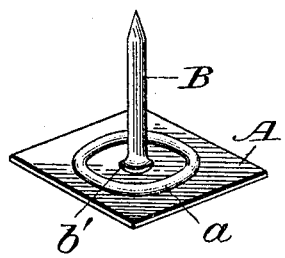
Figure 2:
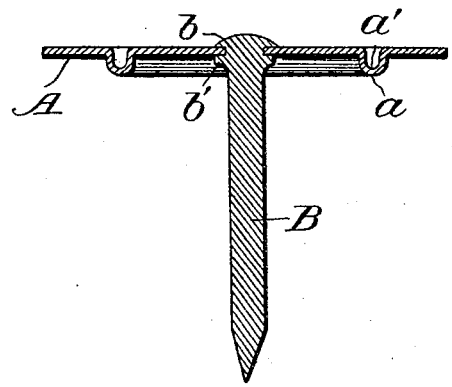
Figure 3:
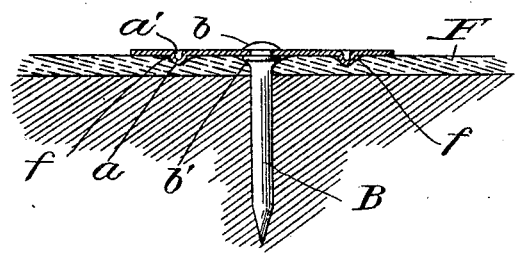

Figure 1 is a perspective view of the preferred form of roofing-nail inverted. Fig. 2 is a detail sectional view of such nail enlarged. Fig. 3 is a similar section showing the nail in use.

In the drawings, A designates the head of the roofing-nail, which may be of any desired exterior contour, being preferably square, as shown, so it can be cut with little waste from strap-metal or strips of suitable material. This head is provided with a depending rib $a$ on its under side, which may be formed by pressing a groove $a'$ in its upper side by suitable dies or in other proper manner. Said rib may be of any desired contour, but is preferably continuous and circular, so as to surround the stem B of the nail. This stem may be formed of an ordinary nail or of a specially-prepared nail, and it is preferably attached at its upper end to the center of the head by means of the swaged rib or collar $b'$ under the head and by expanding or riveting the end of the stem above the head, as at $b$, so that the head is securely attached to the stem. The lower end of the stem is suitably pointed to facilitate its penetration.

It will be observed by reference to Fig. 3 that when one of these nails is driven through the roofing material F the rib $a$ bites into the latter, as at $f$, and forms a water-tight joint therewith, so that if water should penetrate under the projecting edges of the head it would not be able to pass the rib and reach the stem. Consequently it would not be able to percolate through the aperture made by the stem. Further, the flat projecting portion of the head exterior to the corrugation or rib prevents the head embedding too deeply in the felt or the rib cutting the felt out, and it also prevents water collecting in the depression in the felt next the rib. As stated, the rib also stiffens the head and insures an equal bite upon the felt all around the stem, and such rib is the principal feature of the invention.

While I have specifically referred to the nail as a "roofing-nail," it may of course be used for other purposes where the peculiar construction would be useful or advantageous.

Having thus described my invention, what I claim as new, and desire to secure by Letters Patent, is—

1. A roofing-nail head comprising a flat sheet-metal plate provided with an annular corrugation forming a rib on its under surface a distance within the periphery of the plate, for the purpose and substantially as described.

2. A roofing-nail comprising a flat sheet-metal head provided with an annular corrugation a distance within the outer periphery of the plate and constituting a rib on the under side of the head; with a stem attached to the head within the annular corrugation, substantially as set forth.

In testimony that I claim the foregoing as my own I affix my signature in presence of two witnesses.

HOWARD B. SHERMAN.

In presence of—
 WILLIAM H. HART,
 FRANK M. ANDRESS.